J. B. CREIGHTON.
Stump Elevator.
No. 14,651.
Patented April 15, 1856.
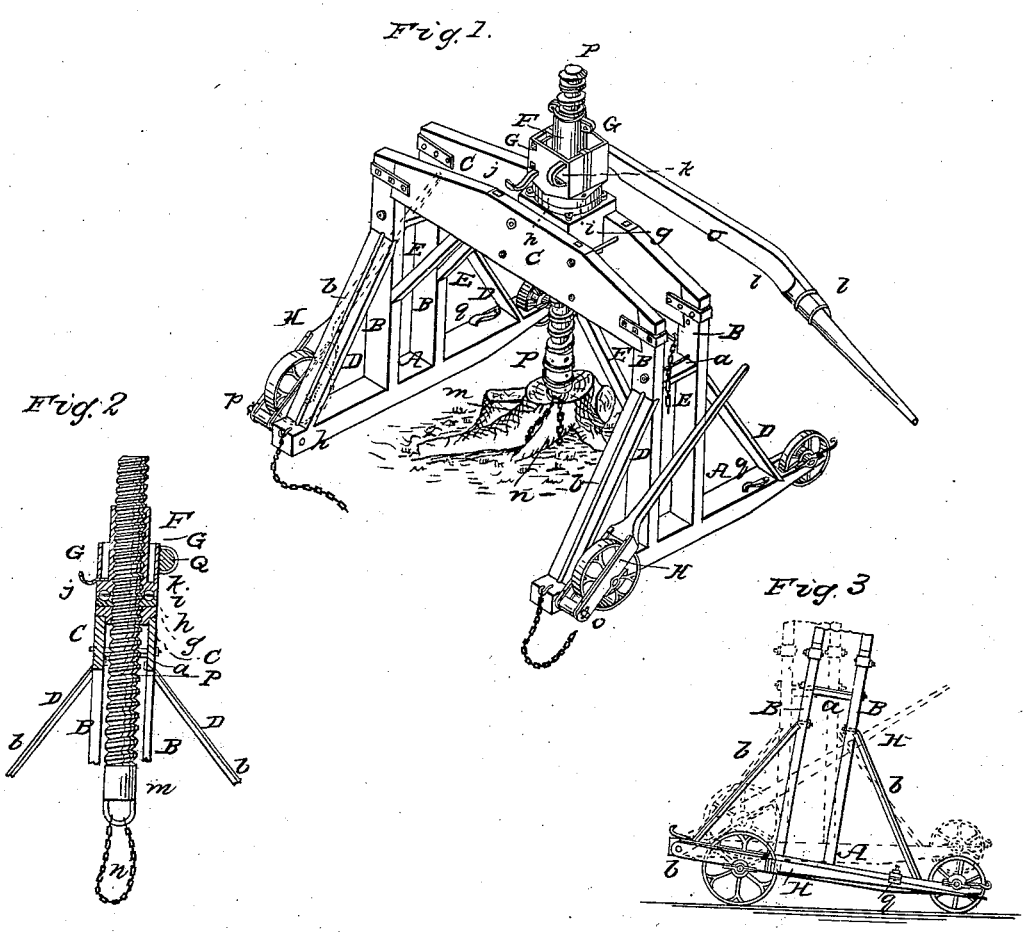

UNITED STATES PATENT OFFICE.

J. B. CREIGHTON, OF TIFFIN, OHIO.

STUMP-EXTRACTOR.

Specification of Letters Patent No. 14,651, dated April 15, 1856.

*To all whom it may concern:*

Be it known that I, J. B. CREIGHTON, of Tiffin, in the county of Seneca and State of Ohio, have invented a new and useful Machine for Extracting Stumps of Trees and other Similar Things Out of the Ground in an Upward Vertical Direction; and I do hereby declare that the following is a full, clear, and exact description of the same, reference being had to the accompanying drawings, forming part of this specification, in which—

Figure 1, is a perspective view of the machine complete and as it appears when extracting or pulling up the stump out of the ground. A stump being represented and the chain or link of the screw secured to the same. Fig. 2, is a vertical transverse section of the nut and screw, also a portion of the frame of the machine. Fig. 3, is an end elevation of the frame of the machine. The black lines in this view show the machine slightly tilted or inclined and as resting on the propelling wheels, the lever which throws the machine in and out of gear being shown fastened down, and the red lines in the same figure represent the machine as it appears when extracting a stump and not resting on the propelling wheels, the lever being shown by red lines elevated and free from the catch which retains it down when the machine is moving toward a stump.

Similar letters of reference in each of the several figures indicate corresponding parts.

This invention relates, 1st, to certain improvements in stump machines whereby stumps can be extracted out of the ground in an upward and vertical direction with great ease and facility, and, 2nd, to a simple method of rendering the machine portable in the shortest space of time when desired or when not drawing a stump and at the same time capable of having a firm and solid foundation independent of the propelling wheels during the operation of extracting a stump, without the necessity of taking off the wheels or adding any additional parts to the machine; and my invention consists, 1st, in employing in the center of a strong portable frame a vertical screw having a clevis on its lower end and a short chain which is hooked by one end in the same and passed around the largest knot or protuberance on the stump and then hooked by its other end in said clevis—and in combination with the said screw and frame, employing on top of the frame a movable or revolving nut which has a circular groove passing around in its lower surface and which corresponds precisely with one on the upper surface of the metallic bearing plate by which it is supported, said grooves forming a circular tube in which are placed balls which support the upper plate and nut above the bearing plate a sufficient distance to prevent their rubbing or causing friction. When the nut revolves the balls roll in the grooves or tube and thereby prevent nearly all of the friction and which fits over the screw and works in the thread of the same, and consequently raises the screw and stump together when the horse, which is attached to the reach of the nut, moves to the right in the path of a horizontal circle and vice versa when he moves to the left.

My invention consists, 2nd, in attaching or securing each of the front wheels in the forward end of a long lever which has its fulcrum in the main frame a short distance forward of the said wheels, so that when it is desired to move the machine forward a short or long distance it will only be necessary to depress these levers and fasten them down to the sides of the main frame, this depressing of the levers causing the front end of the frame to rise, and the forward wheels to bear on the ground, or when it is desired to give the machine a firm basis while extracting a stump it will only be necessary to unfasten the long ends of the levers and they will be caused instantly to rise and allow the machine by its own gravity to occupy a firm horizontal foundation.

To enable others skilled in the art to make and use my invention I will now proceed to describe its peculiar construction and operation.

A, A, represent sills, one end of which is chamfered off on the under side at the ends to which the small stationary wheels are attached so as to allow the small wheels to be raised clear of the ground while the machine is in operation and when the other ends of the sills are mounted on wheels they are brought in contact with the ground and support the sills clear of the ground, and B, B, B, B, four uprights supported by the braces D, D, D, D, which are followed and strengthened by iron rods *b*, *b*, moving through the uprights B, B, and having nuts at each of their ends. E, E, are also braces that run from the uprights B, to cross beams C, C, and are strengthened in like manner with iron rods similar to those b, b.

a, a, are cross pieces for staying the uprights B B.

g, is a cross tie framed in between the beams C, C, and projecting above the tops of the same some distance so that the grooved bearing plate h, may be secured to it as shown in the drawing. On this grooved plate another grooved plate i, rests, which is cast with and forms the bottom of the nut E; said grooves in the bearing plates "h" and "v" forming a circular tube or cylinder around the screw into which balls "2" fit, said balls being large enough to raise the plate "i" above the surface of the plate "h" so as to prevent their rubbing or creating friction said grooves should contain as many balls as it can hold. They should also be of uniform size. The nut E, is surrounded by a hollow sectional box G; the two square frames or parts of which it is composed being secured to the flanges of the nut in the manner shown in Fig. 1. On two sides of the box G' a stirrup j k, is formed in which the sweep O, is secured. The sweep O, is bent slightly downward and jointed at l, l, as seen in Fig. 1. To this sweep the beast of draft is attached and made to move around in the path of a horizontal circle.

P, is the screw passed through the nut and center of the frame in the manner shown in Figs. 1 and 2; this screw has a clevis m, at its lower end, to which the chain n, is fastened in the manner exhibited by the drawing; the chain being secured around the stump or root in the manner shown in Fig. 1. By turning the sweep the nut will turn and consequently the stump and screw cause to rise and the stump to be drawn in a vertical direction out of the ground. This operation is rendered much easier and effectual by my machine than any other heretofore used; for it will be evident that it is much easier to draw a stump upward out of the ground than what it is to draw it in a horizontal direction. This machine is also very simple and cheap and is not liable to get out of repair very soon.

H, H, represent the side levers for regulating the position of the front wheels and also adjusting the machine as desired, each of these levers have a fulcrum at o, p, in each of the sills A, A, and carry one of the front wheels I, I, which are set a short distance behind the fulcrum o, p. In Fig. 3, one of these levers is shown by red lines as elevated, and the propelling wheels thrown off the ground and the sills resting on the ground, and in the same figure the same lever is shown depressed and fastened down by the stop or catch q, and the machine is shown slightly inclined and resting on the propelling wheels. The red lines showing the machine in the position it occupies when drawing the stump and the black lines showing the machine as it appears when being propelled along toward a stump. This I consider a very simple and convenient method of rendering the machine portable and at the same time making it susceptible of resting on a firm foundation without detaching any parts therefrom, or adding any thereto.

When the operator desires to make the machine portable he can readily do so by operating the levers H, H, as described and thus place the machine on four wheels; also when the operator desires to turn the machine in any direction he can readily do so by first raising one end of the machine on wheels and then placing a block of wood under the sill about midway between the two wheels. Then he must raise lever H up high enough to clear the wheel from all obstructions, and fasten it in that position by means of chain "3." The team may be then attached and the machine turned in any required direction. Then the machine may be again mounted on wheels and the block be removed. Thus by this simple arrangement of the wheels levers and chain the machine is rendered portable in any direction and in a very short space of time.

I do not claim the use of balls running in grooves for the purpose of destroying friction; but What I do claim as my invention and desire to secure by Letters Patent is—

1. The combination and arrangement of the vertical screw, the nut and the rollers with the bearing plate and frame, substantially as described and for the purposes specified.

2. I do not claim the use of the wheels or levers or any of the parts separately; but what I do claim as my invention, is the lever H carrying a wheel, in combination with the frame, so as to expedite and facilitate the transportation of the machine. The whole being constructed and arranged as described.

J. B. CREIGHTON.

Witnesses:
 J. C. LEE,
 G. I. KEEN.